Dec. 2, 1941.     F. M. STADER     2,264,597
FASTENER
Filed June 19, 1940
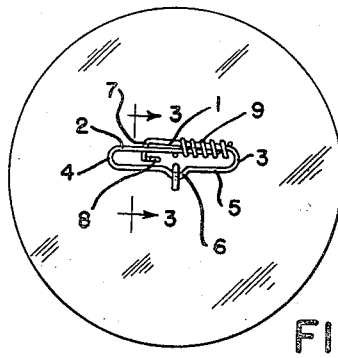
FIG. 1.
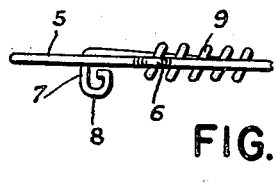
FIG. 2.
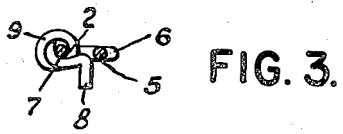
FIG. 3.
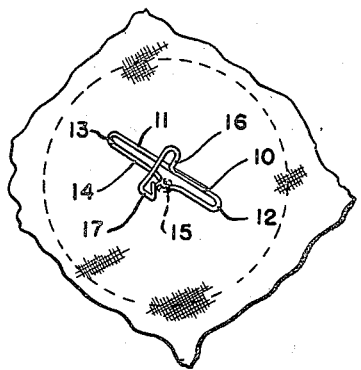
FIG. 4.
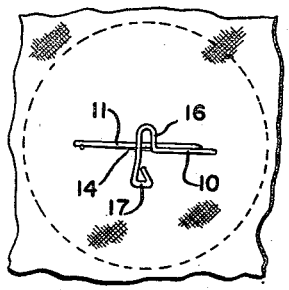
FIG. 5.
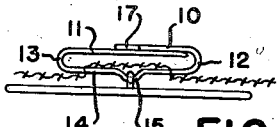
FIG. 6.
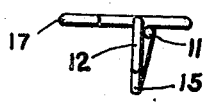
FIG. 7.
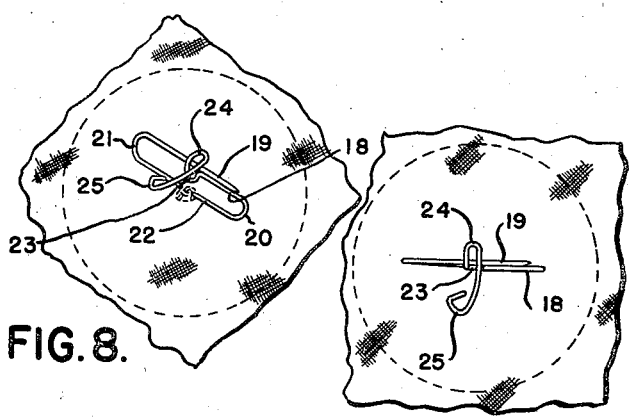
FIG. 8.    FIG. 9.
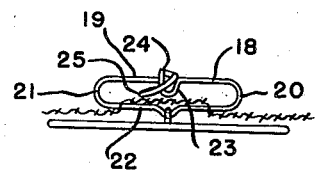
FIG. 10.
FIG. 11.
INVENTOR.
FLORENCE M. STADER
BY Whittemore, Hulbert & Belknap
ATTORNEYS Patented Dec. 2, 1941

2,264,597

UNITED STATES PATENT OFFICE 2,264,597

FASTENER

Florence M. Stader, Plymouth, Mich.

Application June 19, 1940, Serial No. 341,374

7 Claims. (Cl. 24—103)

The invention relates to fasteners adapted particularly for use with wearing apparel.

The invention has for one of its objects to provide an improved fastener for securing two article parts together in which the portion for attachment to one article part may be readily manipulated to facilitate attachment.

The invention has for another object to form the attachment portion with a camming part which can be easily manipulated to move the free entering or threading end of the fastener to a position to permit ready attachment to an article part.

The invention has for a further object to so form the fastener that it may be formed of a continuous length of wire at relatively low cost.

These and other objects of the invention will become apparent from the following description, taken in connection with the accompanying drawing, in which Figure 1 is a view of a fastening device comprising a fastening element shown in plan view and a fastener shown in side view and embodying my invention;

Figure 2 is a plan view of the fastener;

Figure 3 is a cross section on the line 3—3 of Figure 1;

Figure 4 is a perspective view of a fastener illustrating another embodiment of my invention;

Figures 5, 6 and 7 are, respectively, a plan view, a side view, and an end view thereof;

Figure 8 is a perspective view of a fastener illustrating another embodiment of my invention;

Figures 9, 10 and 11 are, respectively, a plan view, a side view, and an end view thereof.

As illustrated particularly in Figure 1, the fastening device comprises a fastener and a fastening element, the fastener being designed to secure the fastening element, such as a button, buckle, or the like, to wearing apparel, such as a coat, dress, or the like. As illustrated in Figure 1 and also Figures 2 and 3, the fastener is formed of a continuous length of wire and is of elongated loop shape having the parts 1 and 2 contiguous and substantially parallel to each other, the curved parts 3 and 4 connecting respectively into the contiguous parts 1 and 2, and the part 5 connecting the curved parts. The part 5 forms the portion for attachment to the fastening element and the wearing apparel element and is provided with the V-shaped part 6 which forms the base for attachment to the fastening element and serves to locate the fastening element relative to the fastener. The portions of the part 5 on opposite sides of the V-shaped part serve to attach the wearing apparel element. The contiguous part 2 terminates in a pointed end which forms the free entering or threading end of the fastener, while the contiguous part 1 has at its end the curved part 7 which extends transversely of and partially around the contiguous part 2 and the finger engaging part 8 which extends transversely of the curved part 7. The construction is such that by pressing upon the finger engaging part 8 and moving the same transversely of the contiguous part 1, the part 7 presses upon the contiguous part 2 and has a camming action thereon to deflect the same so that its pointed end will be moved and laterally spaced from the contiguous part 1 to facilitate the assembly of the fastener with the articles to be secured to each other. 9 is the flexible guard sleeved upon the loop and adapted to encircle the contiguous parts, including the pointed end, when in operative position and to be moved back over the curved part 3 to clear the pointed end when in inoperative position. This fastener may be used either to secure two articles or elements, or different parts of the same article or element together.

Figures 4, 5, 6 and 7 illustrate another embodiment of the fastener to be used for the same purposes as the embodiment of Figures 1, 2 and 3, and in which the fastener is also formed of a continuous length of wire and is in the nature of a loop having the parts 10 and 11 contiguous and substantially parallel to each other, the curved parts 12 and 13 connecting respectively into the contiguous parts 10 and 11, and the part 14 connecting the curved parts. The part 14 forms the portion for attachment to the two article parts formed either of different articles or elements, or of different parts of the same article or element, and is provided with the V-shaped part 15 which forms the base for attachment and which serves to locate one article part relative to the fastener and the other article part. The contiguous part 11 terminates in a free end which is pointed, while the contiguous part 10 has at its end the return-bent camming part 16 which extends transversely over and is engageable with the contiguous part 11 to deflect the latter and move its pointed end away from the contiguous part 10. 17 is a finger engaging part connected to the camming part for actuating the latter to facilitate ready attachment of the fastener to the parts to be secured together. The construction is such that by pressing upon the finger engaging part 17 and moving the same transversely and substantially parallel to the plane of the fastener loop, the part 16 presses upon the contiguous part 11 and has a camming action thereon to deflect the same and thereby move its pointed end away from the contiguous part 10.

In the modification illustrated in Figures 8, 9, 10 and 11, the fastener is also formed of a continuous length of wire and is adapted to be used for the same purposes as the previous modifications. The fastener is in the nature of a loop having the contiguous parts 18 and 19 substantially parallel to each other, the curved parts 20 and 21 connecting respectively into the contiguous parts 18 and 19 and the part 22 connecting the curved parts. The part 22 forms the attachment portion and is constructed in the same manner as the part 5 and the part 14 previously described. The contiguous part 19 terminates in a pointed end, while the contiguous part 18 has at its end two transverse parts 23 and 24. The part 23 is return bent and extends transversely of and at the side of the contiguous part 19 substantially parallel to the plane of the fastener loop. The part 24 is return bent and extends transversely of and over the contiguous part 19. A finger engaging part 25 connected to the part 24 is adapted to be moved to actuate the transverse parts 23 and 24 to thereby deflect the contiguous part 19 and move its pointed end away from the contiguous part 18. It will be seen that the transverse parts serve in normal position to position the contiguous parts in proper relation to each other and that these transverse parts also serve upon being actuated by depressing the finger engaging part to move the pointed end away from the adjacent contiguous part.

What I claim as my invention is:

1. A fastener for securing two article parts together, said fastener comprising an attachment portion and a second portion having parts contiguous and substantially parallel to each other, one of said contiguous parts terminating in a free end and the other of said contiguous parts having a camming part extending transversely of and engageable with said first mentioned contiguous part to deflect the latter and move its free end away from the last mentioned contiguous part.

2. A fastener for securing two article parts together, said fastener being formed of a continuous length of wire and having parts contiguous and substantially parallel to each other, one of said contiguous parts having a free end beside the other of said contiguous parts and the other of said contiguous parts having a camming part engageable with said first mentioned contiguous part to deflect the latter and move its free end away from the other of said contiguous parts.

3. A fastener for securing two article parts together, said fastener comprising an attachment portion and a second portion having parts contiguous and substantially parallel to each other, and curved parts connecting into said contiguous parts, one of said contiguous parts terminating in a pointed end and the other of said contiguous parts having at its end a curved part extending transversely of and partially around the other of said contiguous parts, and a finger engaging part extending transversely of said last mentioned curved part.

4. A fastener for securing two article parts together, comprising an attachment portion and a second portion having parts contiguous and substantially parallel to each other, one of said contiguous parts terminating in a pointed end and the other of said contiguous parts having a camming part extending over and engageable with said first mentioned contiguous part to deflect the latter and move its pointed end away from said second mentioned contiguous part.

5. A fastener for securing two article parts together, comprising an attachment portion and a second portion having parts contiguous and substantially parallel to each other, one of said contiguous parts terminating in a pointed end and the other of said contiguous parts having transverse parts extending over and at the side of and engageable with said first mentioned contiguous part to normally position said contiguous parts relative to each other and to also move said pointed end away from said second mentioned contiguous part upon movement of said transverse parts.

6. A fastener for securing two article parts together, said fastener being formed of a continuous length of wire and having an attachment portion and a second portion having parts contiguous and substantially parallel to each other, one of said contiguous parts terminating in a pointed end and the other of said contiguous parts having a camming part extending over and engageable with said first mentioned contiguous part to deflect the latter and move its pointed end away from said second mentioned contiguous part, and a finger engaging part for actuating said camming part.

7. A fastener for securing two article parts together, said fastener being formed of a continuous length of wire and having an attachment portion and a second portion having parts contiguous and substantially parallel to each other, one of said contiguous parts terminating in a pointed end and the other of said contiguous parts having transverse parts extending over and at the side of and engageable with said first mentioned contiguous part to normally position said contiguous parts relative to each other and to also move said pointed end away from said second mentioned contiguous part upon movement of said transverse parts, and a finger engaging part for actuating said transverse parts.

FLORENCE M. STADER.